Patented Dec. 17, 1929

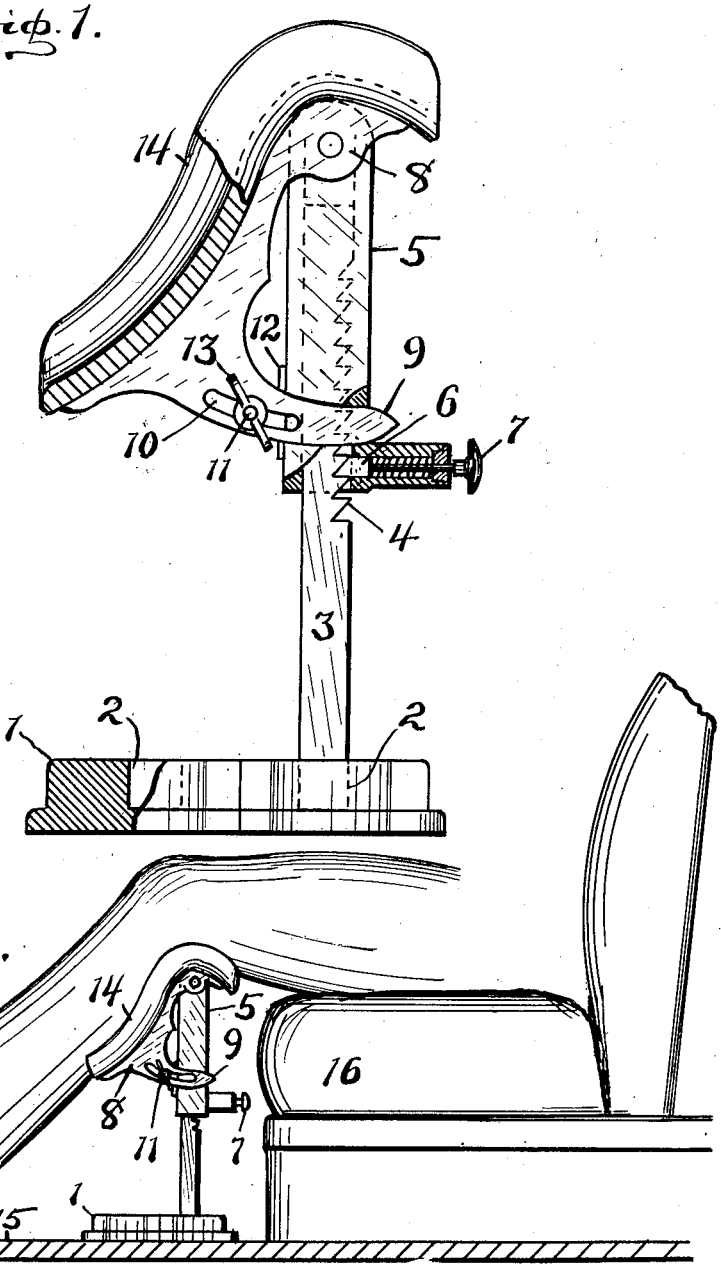

1,740,267

UNITED STATES PATENT OFFICE

JOHN M. REMINGTON, OF FORT WAYNE, INDIANA

LEG REST FOR AUTOISTS

Application filed March 2, 1928. Serial No. 258,539.

This invention relates to improvements in leg rests for autoists, and the object thereof is to provide in an automobile between the driver's seat and the foot throttle, an adjustable appliance for sustaining the weight of the leg of the driver for the purpose of obviating fatigue.

The object of the invention is accomplished by the construction illustrated in the accompanying drawings, in which:—

Fig. 1 is a side elevation of a construction embodying the invention, parts thereof being in section; and Fig. 2 is a side elevation showing the invention applied to an automobile.

The characters appearing in the description refer to parts shown in the drawings and designated thereon by corresponding characters.

The invention consists of a base 1 having sockets 2 in its top into which is selectively stepped a post 3, said post having made therein a series of ratchet teeth 4.

Upon said post is mounted a sleeve 5 that is vertically movable thereon, and has in connection therewith a spring pressed latch 6 operated by a knob 7, which latch has engagement with the ratchet teeth 4 in said post so that the sleeve may be adjustably positioned upon the post and sustained thereon at various elevations.

Upon the upper end of the sleeve 5 is pivoted a bracket 8 provided with a slotted arcuate arm 9, through the slot 10 of which extends a bolt 11 that projects from a bracket 12 on the front faces of said sleeve. A thumbnut 13 on said bolt has clamping relation with said arm whereby said bracket may be secured in various adjusted positions relative to said sleeve.

A cradle 14 is fixed upon the bracket 8, said cradle being shaped to approximately fit the underside of the knee joint and adjacent leg portions of the driver, and is movable with said bracket.

The upper portion of the cradle that supports the knee joint of the operator is short and is in closed proximity to the pivotal connection of the bracket and sleeve, and the pendant portion of the cradle that supports the calf of the operator's leg, is of much greater length than the upper portion.

The appliance is positioned with its base secured upon the floor 15 of an automobile between the driver's seat 16 and the floor-board 17 through which the foot throttle 18 for the control of the auto engine extends, so that the driver when seated with his foot upon the throttle, may receive support for his leg resting in the cradle. By vertically adjusting the sleeve upon the post, and by adjustably tilting the cradle on said sleeve, the driver's leg may be sustained at such elevation and angle as will augur to his comfort.

In utilizing the invention the cradle is adjustably positioned at such height as to sustain the operator's leg in such position that his foot normally has contact with the throttle but with slight pressure. The throttle may then be operated by exerting ankle movement. Such action, while the leg is supported in the cradle, relieves the operator of the strain of muscular exertion in supporting the weight of his leg, which during protracted rides causes great fatigue. Moreover, that tendency causing irregular and unintentional opening of the throttle because of jolting and involuntary movements of the driver's leg is obviated almost entirely by the support applied to the driver's leg.

A feature of the invention is that the cradle is so formed that when adjustably tilted upon its pivotal support to bring the lower portion thereof into contact with the calf of the operator's leg, the supporting relation of the cradle with the knee joint is not materially affected thereby.

What I claim is:—

A leg rest consisting of a post and base therefor, a sleeve adjustably positioned on said post; and a cradle shaped to fit beneath the knee joint and calf of the operator's leg, said cradle being pivotally related with said sleeve, the upper knee joint supporting portion being materially shorter and in closer proximity to the pivotal support of the cradle than the calf supporting portion thereof; and means for securing said sleeve and cradle in adjusted positions.

In testimony whereof I affix my signature.

JOHN M. REMINGTON.